H. B. SMITH.
FLEXIBLE POWER TRANSMISSION.
APPLICATION FILED MAR. 7, 1916.

1,203,424.

Patented Oct. 31, 1916.
2 SHEETS—SHEET 1.

WITNESSES
Wm. P. Goebel.
J. E. Larsen

INVENTOR
H. B. Smith
BY
ATTORNEYS

H. B. SMITH.
FLEXIBLE POWER TRANSMISSION.
APPLICATION FILED MAR. 7, 1916.
1,203,424.
Patented Oct. 31, 1916.
2 SHEETS—SHEET 2.
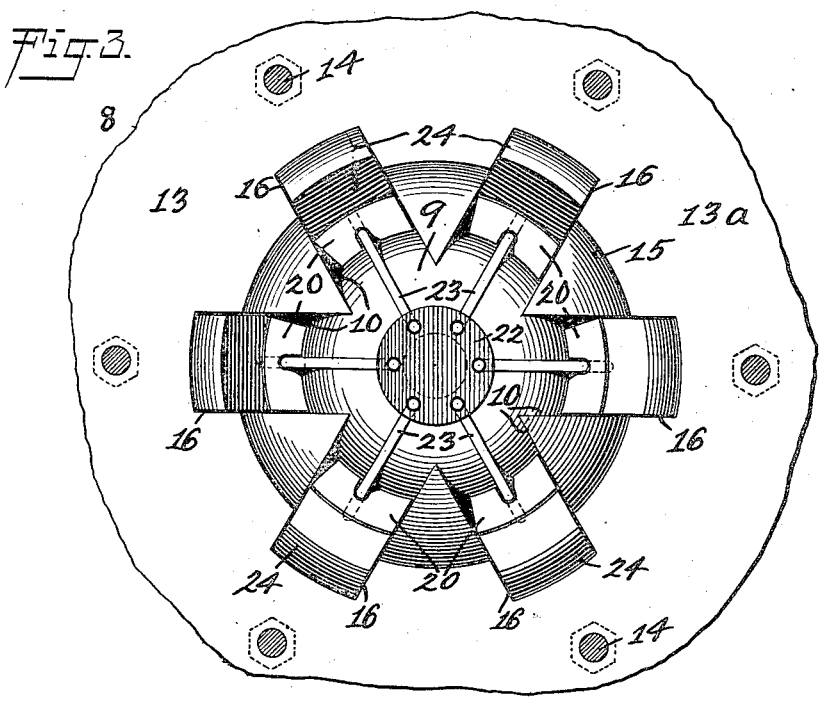
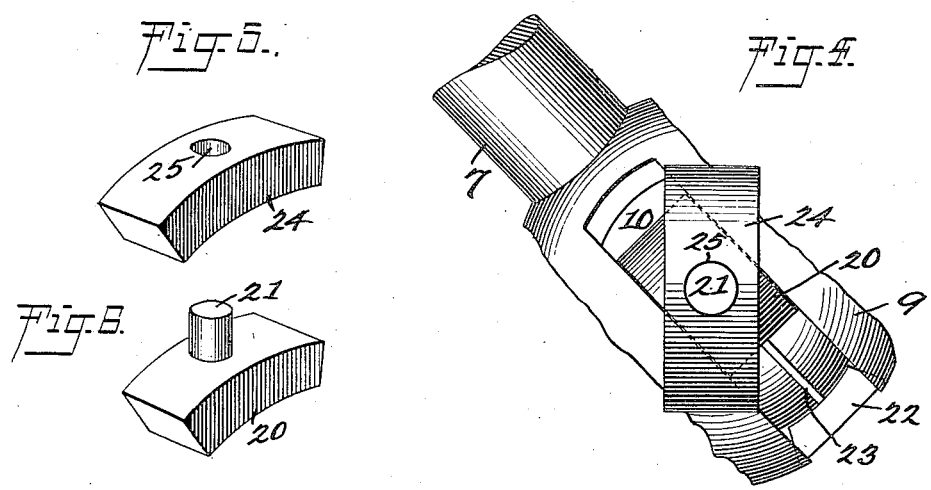
WITNESSES
William P. Goebel
J. E. Larsen
INVENTOR
H. B. Smith
BY Munn & Co
ATTORNEYS

UNITED STATES PATENT OFFICE.

HAROLD B. SMITH, OF PENDLETON, OREGON.

FLEXIBLE POWER TRANSMISSION.

1,203,424.  Specification of Letters Patent.  Patented Oct. 31, 1916.

Application filed March 7, 1916. Serial No. 82,600.

*To all whom it may concern:*

Be it known that I, HAROLD B. SMITH, a citizen of the United States, and a resident of Pendleton, in the county of Umatilla and State of Oregon, have invented certain new and useful Improvements in Flexible Power Transmissions, of which the following is a specification.

My invention relates to universal joints, particularly to the ball and socket type, and the main object thereof is to provide such a device between a driving and a driven element the axes of which may be moved into angular relationship and which device is maintained at high efficiency in any such angular relationships irrespective of the vertical load upon either or both of said elements.

My invention is well adapted to be used in connection with the wheels of automobile trucks, propellers of boats, and machinery of various kinds and classes, the operative parts being contained within a sealed housing containing a suitable lubricant and adapted for use beneath the surface of water.

My invention is fully described in the following specification, of which the accompanying drawings form a part, in which like characters refer to like parts in each of the views, and in which:—

Figure 1:
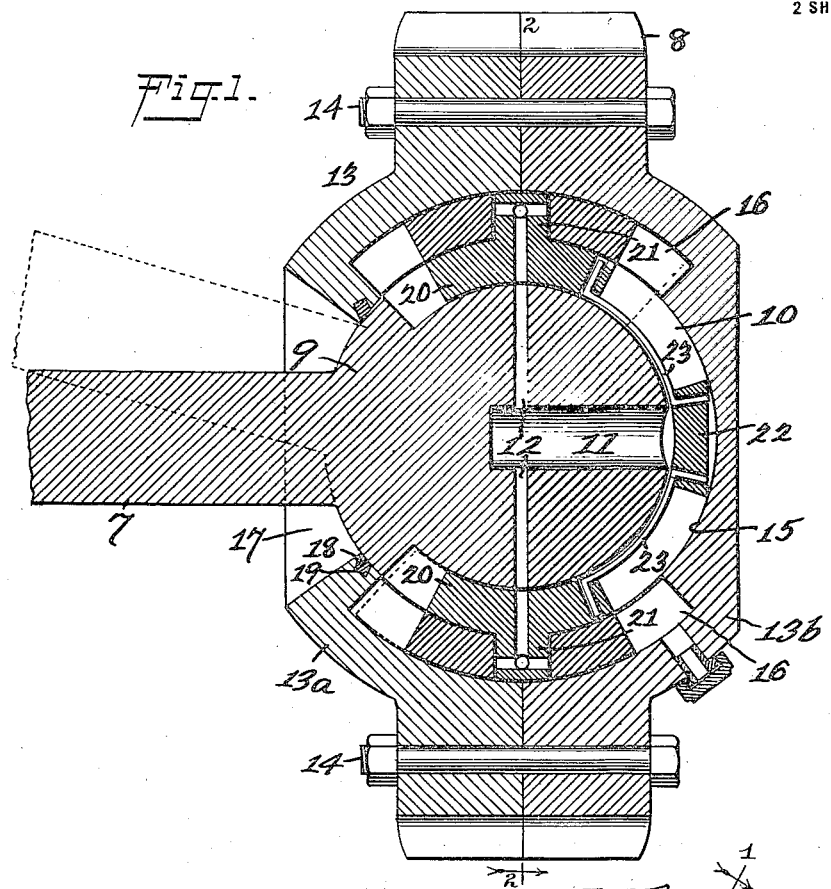
Figure 2:
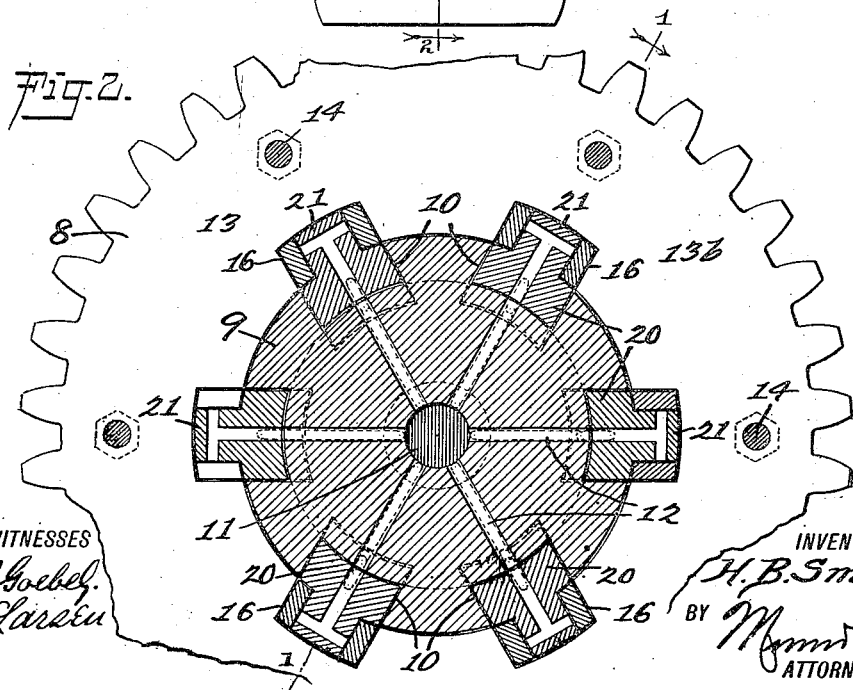

Figure 1 is a section taken through one embodiment of my invention, taken on the line 1—1 of Fig. 2; Fig. 2 is a section taken on the line 2—2 of Fig. 1; Fig. 3 is a view taken from the right hand side of Fig. 1 with part of the housing removed; Fig. 4 is a fragmentary detached view of the ball of the joint and showing one set of the slide blocks which I employ; Fig. 5 is a detached perspective view of one of said slide blocks; and Fig. 6 is a similar view of the complemental slide-block of one set.

My invention consists primarily of a driving element 7 illustrated as a shaft and a driven element 8 illustrated as a gear wheel, although the latter might be the driving element and the former the driven element, as will be readily understood.

The shaft 7 has a ball 9 at the end thereof provided with a plurality of grooves 10 extending, each, almost entirely around the ball in the axial plane of the shaft 7, these grooves being six in number in the form shown and being equidistant from each other, and said ball is further provided with an axial bore 11 and radial bores 12 in the planes of said grooves to transmit lubricants to different points on the surface of said ball.

The ball 9 is inclosed within a housing 13 formed of two members 13$^a$ and 13$^b$ locked together by bolts 14, and said housing carries the gear wheel 8 as clearly shown in Figs. 1 and 2, but any suitable equivalent of the said wheel may be provided.

The housing 13 is provided with a substantially spherical recess 15 of the approximate diameter of the ball 9 and with a plurality of grooves 16 registering with the positions of the grooves 10 when the elements 7 and 8 are in normal positions, and said housing is also provided with a conical opening 17 for the passage of the shaft 7 and of a diameter allowing a considerable degree of lateral movement or rotary movement of said shaft. In order to confine the lubricants within the housing 13 I provide a packing 18 in a channel 19 in the interior of the housing around the opening 17 and which also serves as a dust and water guard.

Arranged in each groove 10 is a segmental slide block 20 the outer surface of which is formed on the contour of the ball, said blocks being fitted into the respective grooves in a readily slidable manner and each of said blocks carries a post 21 on its outer surface and centrally thereof. These blocks are held in relative positions, or in alinement, by means of a spider formed of a disk 22 and a plurality of arms 23 in pivotal connection therewith and with the respective slide blocks 20 so that all of the latter may slide in their respective grooves collectively and I provide lubricating passages through the said slide blocks and their posts 21.

Each of the slide blocks 20 is provided with a complemental slide block 24 slidably fitted in the respective grooves 16 and the surface of which adjacent the slide block 20 is formed on the contour of the ball 9, each of the blocks 24 being provided with a bore 25 for the reception of one of the respective posts 21 whereby the slide blocks 24 may revolve upon the respective slide blocks 20 around the posts thereof.

When the shaft 7 is moved laterally from normal position, as indicated by dotted lines in Fig. 1, the blocks 24 in the plane of this shaft movement move in their respective grooves 16 and the blocks 20 may also move in their respective grooves 10, but the other blocks 24 do not move the same distance as those referred to although they do revolve in varying degree on their posts 21 as the grooves 10 and 16 are carried out of alinement by the ball movement within the housing, the blocks 24 which may be in a plane perpendicular to the plane of shaft movement not sliding in their grooves at all but they revolve about their posts in maximum degree in these positions.

The rotation of the shaft 7 revolves the housing 13 irrespective of the angular relationship therebetween, within the limits of the device, the slide blocks sliding in their respective grooves in progressively increasing degrees from the position of greatest rotation about their posts 21 to the position of least rotation on said posts, the position of maximum sliding movement being that of minimum rotary movement about a post, and the position of minimum sliding movement being that of maximum rotary movement of the blocks.

While I have shown the ball 9 as an integral part of the shaft 7 I may make the ball and shaft separately and join them in any desired manner, and I may make other changes in and modifications of the structure shown and described provided that such changes come within the scope of the appended claims.

Having fully described my invention, what I claim as new, and desire to secure by Letters Patent, is:—

1. A device of the class described, comprising a driving element, a driven element, one of said elements carrying a casing provided with a spherical recess and an opening in one side thereof, the other element projecting through said opening and carrying a ball fitted into said recess, said casing and ball being provided with grooves which register when said elements are in normal positions, a slide block in each ball groove having a post thereon, and a slide block in each casing groove rotatably mounted on the respective post.

2. A device of the class described, comprising a driving element, a driven element, one of said elements carrying a casing provided with a spherical recess and an opening in one side thereof, the other element projecting through said opening and carrying a ball fitted into said recess, said casing and ball being provided with grooves which register when said elements are in normal positions, a slide block in each ball groove having a post thereon, means for maintaining said blocks in a fixed relative position, and a slide block in each casing groove rotatably mounted on the respective post.

3. A device of the class described, comprising a driving element, a driven element, one of said elements carrying a casing provided with a spherical recess and an opening in one side thereof, the other element projecting through said opening and carrying a ball fitted into said recess, said casing and ball being provided with grooves which register when said elements are in normal positions, a slide block in each ball groove, a spider in operative connection with all of said blocks, and a slide block in each casing groove rotatably connected with the respective ball slide block.

4. A device of the class described, comprising a driving element, a driven element, one element carrying a casing provided with a plurality of equidistant arcuate grooves, an arcuate slide block fitted into each groove, the other element carrying a ball fitted into said casing, and a plurality of radially arranged posts movably carried by said ball and engaged with the respective slide blocks, the arcs of said grooves and blocks having equal radii the centers of all of which are at the center of said ball.

5. A device of the class described, comprising a driving element, a driven element, one of said elements carrying a casing provided with a spherical recess and an opening in one side thereof, the other element carrying a ball fitted into said recess, means for rendering said casing water and dust proof, said casing and ball having complemental grooves in register when said elements are in normal positions, a slide block in each ball groove having a post thereon, and a slide block in each casing groove rotatably mounted on the respective post.

HAROLD B. SMITH.

Witnesses:
OSMER E. SMITH,
C. L. MAYO.